May 26, 1942.   J. P. ASHCRAFT   2,283,903
VALVE
Filed April 29, 1940
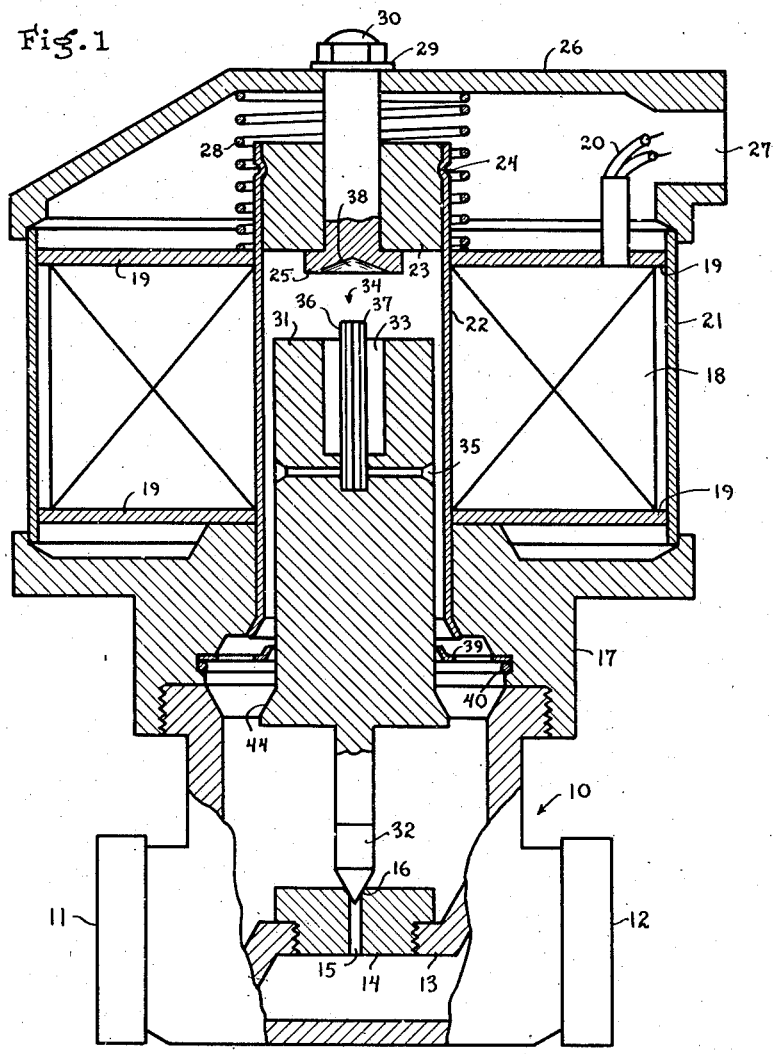
INVENTOR
Joseph P. Ashcraft
BY George H Fisher
ATTORNEY Patented May 26, 1942

2,283,903

UNITED STATES PATENT OFFICE 2,283,903

VALVE

Joseph P. Ashcraft, Dallas, Tex., assignor to Minneapolis-Honeywell Regulator Company, Minneapolis, Minn., a corporation of Delaware Application April 29, 1940, Serial No. 332,172

7 Claims. (Cl. 175—372)

My invention relates to a solenoid mechanism, and more articularly to one designed to operate a valve.

Solenoid operated valves of the type which move to one position upon energization of the solenoid, and return to the opposite position through the action of gravity or other biasing means upon deenergization of the solenoid, sometimes tend to stick in the energized position. It has been found that one of the principal causes of such faulty action is the formation of a gummy deposit on the surfaces of the core and the stop member against which the core is held during energization. This condition is particularly liable to occur when the valve construction is such that the fluid passing through the valve circulates about the core and related parts for ventilation purposes, especially when the fluid is one which contains a high proportion of gum-forming substances. Gaseous fuels containing certain petroleum products are especially apt to cause sticking. Since the fluids most likely to cause valve sticking due to gum deposits are those which are most highly combustible and dangerous to handle, it is necessary that means be provided to overcome the stickiness of the gum deposit and permit proper action of the valve.

An object of the present invention is to prevent sticking of the valve.

Another object of the invention is to provide a valve-operating solenoid including a device, which upon deenergization of the solenoid, creates a positive force tending to separate the solenoid core from surfaces with which it has been held in contact.

A further object of the invention is to provide such a solenoid mechanism utilizing a thermostatic member to create the separative force.

A further object of the invention is to provide a solenoid mechanism including such a thermostatic member, which shall not be critical as to its operating temperature, but which shall function upon a drop in said operating temperature from any substantially constant value to produce a separative force.

A further object of the invention is the provision of a solenoid mechanism including means to prevent the sticking of the solenoid core in its energized position, which shall be simple and inexpensive in construction.

Other objects of the invention will be apparent from the accompanying specification, claims, and drawing, in which:

Figure 1 is a sectional view of a preferred embodiment of my invention applied to the operation of a valve, Figure 2 is a sectional view of certain details of the device of Figure 1, showing the parts in a different operating position; and Figure 3 is a section taken on the line 3—3 of Figure 2, looking in the direction of the arrows.

The valve body or casing is generally designated at 10 and has an inlet connection 11 and an outlet connection 12. The valve body 10 is provided with the usual transverse wall 13 which separates the inlet 11 and outlet 12 and is provided with an opening in which a plug 14 is threaded. The plug 14 has an aperture 15 therethrough which is flared at its upper end to provide a valve seat 16. Threaded on the upper portion of the valve casing 10 is a solenoid supporting member 17. Mounted above this supporting member is an electromagnetic coil 18 and above and below said coil are steel plates 19. Lead wires 20 extend upwardly from the coil 18 through the plate 19.

Surrounding the coil 18 and the plates 19 is a casing member 21 of magnetic material. Inside of the coil 18 is a non-magnetic tube 22 of some material of relatively low conductivity, such as brass, which is secured and sealed to the supporting member 17 in any suitable manner. The upper end of the tube 22 is closed by means of a non-magnetic plug 23 of a highly conductive material, such as copper, which is secured to the tube as shown at 24. A stop pin 25, of magnetic material, extends through the plug 23 and through a cover 26 of non-magnetic material having a conduit opening 27 therein to accommodate the lead wires 20. A spring 28 secures the plates 19 and the coil 18 against the supporting member 17. The pin 25 is provided at its outer end with a lock washer 29 and a nut 30. By means of this construction the various parts of the solenoid valve are secured in their proper positions when the nut 30 is tightened on the pin 25.

A core 31 is loosely mounted in the tube 22 so that fluid from the valve may circulate around it for cooling purposes. The valve stem 32 is attached to the core 31 in any suitable manner. The core 31 is bored centrally of its top surface to provide a well 33. A thermostatic element generally indicated at 34 is attached to the core at the bottom of this well in any suitable manner, being shown in the drawing as fastened by a countersunk rivet 35 extending diametrically through the core.

The stop pin 25 is provided with a conical depression, as at 38, which cooperates with the upper end of the thermostatic element 34 to form a means for centering the core 31 in the tube 22 when the coil 18 is energized. A flat centering spring 39 is held in place in a groove in the supporting member 17 by a split ring clamp 40. This centering spring cooperates with a flared portion 44 at the lower end of the core 31 so as to hold the core in the center of the tube 22. This centering means and that previously described at the top of the core 31 cooperate to hold the core in a vertical position while the valve is energized. If a gummy deposit forms on the contacting surfaces which correspond to these in a conventional valve structure, they are likely to stick together and hold the core up and the valve open when the coil is deenergized.

The spring 39 has its central portion deflected slightly upward by the flared portion 44 of the core 31 when the coil 18 is energized. This deflection of the spring causes it to bias the core 31 for downward movement. When the coil 18 is deenergized, this bias tends to move the shell downward and thus to disengage any surfaces which may be stuck together by a gum deposit. This bias is insufficient, however, to free the shell when an extremely large deposit of gummy substance is present.

The conducting plug 23 serves to shade the magnetic flux produced within the solenoid so that the valve will function without hum or chattering when energized by alternating current. The flux produced by the coil 18 sets up eddy currents in this plug 23. These eddy currents in turn set up a shading flux which is out of phase with the flux produced by the coil 18. The path of the magnetic flux produced by the coil 18 may be traced from the core 31 across the air gap to the lower plates 19, thence through the casing 21 and upper plates 19 back across the air gap to the core 31. The magnetic path followed by the flux produced by the eddy currents in the plug 23 may be traced from the pin 25 through the core 31 across the air gap to the lower plates 19, thence through the casing 21 and the upper plates 19 and across the large air gap between these plates and the upper end of pin 25. Although the flux in either one of these paths passes through zero twice with each complete cycle of the alternating current, the flux in both paths is never zero at the same time so that a force is always acting to hold the core in its energized position. Chattering of the valve core which might be caused by the magnetic flux passing through zero is thereby prevented.

The thermostatic member 34 is fashioned from a pair of bimetallic strips 36 and 37, each semi-cylindrical in shape with their flat surfaces placed against each other. These strips are fastened together at their lower ends in any convenient manner. The flat surfaces of these bimetallic strips are of some magnetic material having a high coefficient of thermal expansion, such as cold rolled steel. The outer parts of the rounded surfaces of these bimetallic strips are of some magnetic material having a low coefficient of thermal expansion such as Invar.

When these bimetallic strips are near normal room temperature, their flat surfaces lie together so that they form a substantially cylindrical rod.

After energization of the coil 18 the internal temperature of the solenoid begins to rise. As the temperature rises the bimetallic strips 36 and 37 separate at their upper ends due to the unequal expansion of their parts, eventually taking up a position such as that shown in Figure 2. As these members separate, they move against the conical sides of the depression 38 and thereby force the core 31 slightly downward within the tube 22. The final position taken by the strips 36 and 37 and by the core 31 depends entirely on the final temperature reached within the solenoid. The strips may be designed, however, so that their ends will not move beyond the edges of the depression 38 with any operating temperature which can reasonably be expected.

The heating of the upper ends of strips 36 and 37 is aided by the crowding of the shading flux therein. As these ends are the only magnetic parts in contact with the stop pin 25, they are substantially saturated magnetically. Consequently, the heating effects therein due to eddy currents and hysteresis are great.

Upon deenergization of the coil 18, the heating of the strips 36 and 37 ceases and they begin to contract toward their normal position. As they contract, a force is created tending to separate them from the walls of the depression 38. It will be seen therefore that if any gummy deposit has formed in the depression 36 which might tend to make the valve core 31 stick in its energized position, the warping of the strips 36 and 37 upon the cooling thereof incident to deenergization will pull them away from this gummy deposit, thereby releasing the core and allowing the valve to close.

It should be apparent in view of the foregoing description, that I have provided a solenoid valve wherein sticking of the valve parts in their energized position is effectively prevented. It should also be apparent that my device is simple and inexpensive in construction, and dependable in operation.

Many simple modifications of my device could be made, without invention, by any person skilled in the art. For instance, the thermostatic member 34 could be mounted on the stop pin 25, and a conical depression provided on the core 31. Alternatively, the bimetallic strips could be designed to spread apart upon cooling, and a conical peak could then be used instead of a conical depression. Also, the thermostatic member of my device could be a solid rod of a material having a high coefficient of thermal expansion, having its free end formed to cooperate with the conical depression. My thermostatic member might alternatively be formed of two conventional bimetallic strips of rectangular cross-section. It is preferable, however, that the upper ends of the strips be rounded or otherwise formed to cooperate with the conical surface, regardless of the cross-sectional shape of the other parts of the strips.

While I have shown a specific embodiment of my invention, it will be understood that this is for purposes of illustration only and that my invention is limited only by the scope of the appended claims.

I claim as my invention:

1. An electromagnetic actuator, comprising in combination, a coil, a core movable within said coil, a stop for limiting the movement of said core and having a substantially conical depression therein, and an elongated thermostatic member attached at one end to said core and formed at its other end to cooperate with said conical depression, so that expansion of said member causes it to be forced slightly out of said depression and contraction of said member causes it to separate from the walls of said depression.

2. An electromagnetic actuator, comprising in combination, a coil, a core movable within said coil, a stop member for limiting the movement of said core and having a substantially conical depression centrally located therein, a thermostatic member attached to said core so as to engage said depression upon energization of said coil, said thermostatic member contracting so as to separate from said depression upon deenergization of said coil, and centering means at the opposite end of said core from said thermostatic member and said stop member and cooperating with said members to hold said core substantially centrally of said coil during energization thereof.

3. An electromagnetic actuator, comprising in combination, a coil, a member movable within said coil, a stationary member, a substantially conical surface on one of said members, and means responsive to energization of said coil mounted on the other of said members for engagement with said surface upon energization of said coil, said means acting upon deenergization of said coil to separate from said surface.

4. An electromagnetic actuating mechanism comprising a coil, a core movable within said coil, a stop for limiting the movement of said core, and thermostatic means attached to said core so as to contact said stop upon energization of said coil, said thermostatic means contracting so as to separate from said stop upon deenergization of said coil.

5. Electromagnetic actuating mechanism comprising a coil, a core movable within said coil, a stop for limiting the movement of said core, and a bimetallic member attached to said core so as to contact said stop upon energization of said coil, said bimetallic member adapted to warp away from said stop upon deenergization of said coil.

6. Electromagnetic actuating mechanism comprising a coil, a core movable within said coil, a stop for limiting the movement of said core and having a substantially conical depression therein, and an elongated thermostatic member attached at one end to said core and formed at its other end so as to be receivable in said conical depression, said thermostatic member expanding against the sides of said depression when heated by energization of said coil, and contracting so as to separate from the sides of said depression when cooled by deenergization of said coil.

7. Electromagnetic actuating mechanism comprising a coil, a core movable within said coil, a stop for limiting the movement of said core and having a substantially conical depression therein, and two substantially semi-cylindrical bimetallic strips attached at one end to each other and to said core, and formed at their free ends so as to be receivable in said conical depression, said strips warping said free ends away from each other and against the sides of said depression when heated by energization of said coil, and warping said free ends towards each other and away from the sides of said depression when cooled by deenergization of said coil.

JOSEPH P. ASHCRAFT.